United States Patent [19]

Basch et al.

[11] 4,212,316
[45] Jul. 15, 1980

[54] CONTROL VALVE

[75] Inventors: Walter E. Basch, St. Louis, Mo.;
Roger G. Wallis, Belleville, Ill.

[73] Assignee: ACF Industries, Incorporated, New York, N.Y.

[21] Appl. No.: 885,886

[22] Filed: Mar. 13, 1978

[51] Int. Cl.² .............................................. F16K 15/02
[52] U.S. Cl. ................................ 137/543.17; 417/471
[58] Field of Search ................... 137/543.17; 251/368; 417/471

[56] References Cited

U.S. PATENT DOCUMENTS

| | | | |
|---|---|---|---|
| 2,600,554 | 6/1952 | Lyons | 137/543.17 X |
| 3,150,601 | 9/1964 | Smith et al. | 417/471 |
| 3,244,195 | 4/1966 | Wanner | 137/543.17 |
| 3,878,861 | 4/1975 | Pareja | 137/543.17 |

Primary Examiner—William R. Cline
Attorney, Agent, or Firm—J. Joseph Muller

[57] ABSTRACT

A control valve for use in an automotive fuel pump. A housing is installed in the fuel pump and has a central circular opening therethrough the peripheral surface of which is curved. A valve member is movable relative to the circular opening and has an outer curved contact surface for sealingly contacting the curved peripheral surface to prevent flow of a fuel through the opening. The curved surface of the valve member tangentially contacts the curved peripheral surface to seal against flow. A coil compression spring seats against one end of the housing and continuously urges the valve member into sealing contact with the curved peripheral surface. The force exerted by the spring on the valve member is such that it remains seated and a minimal amount of fuel leakage occurs through the control valve when the fuel pump is not pumping even though the curved contact surface of the valve member is subjected to a force applied in the normal direction of fuel flow through the control valve equal to a predetermined positive head of fuel.

2 Claims, 6 Drawing Figures

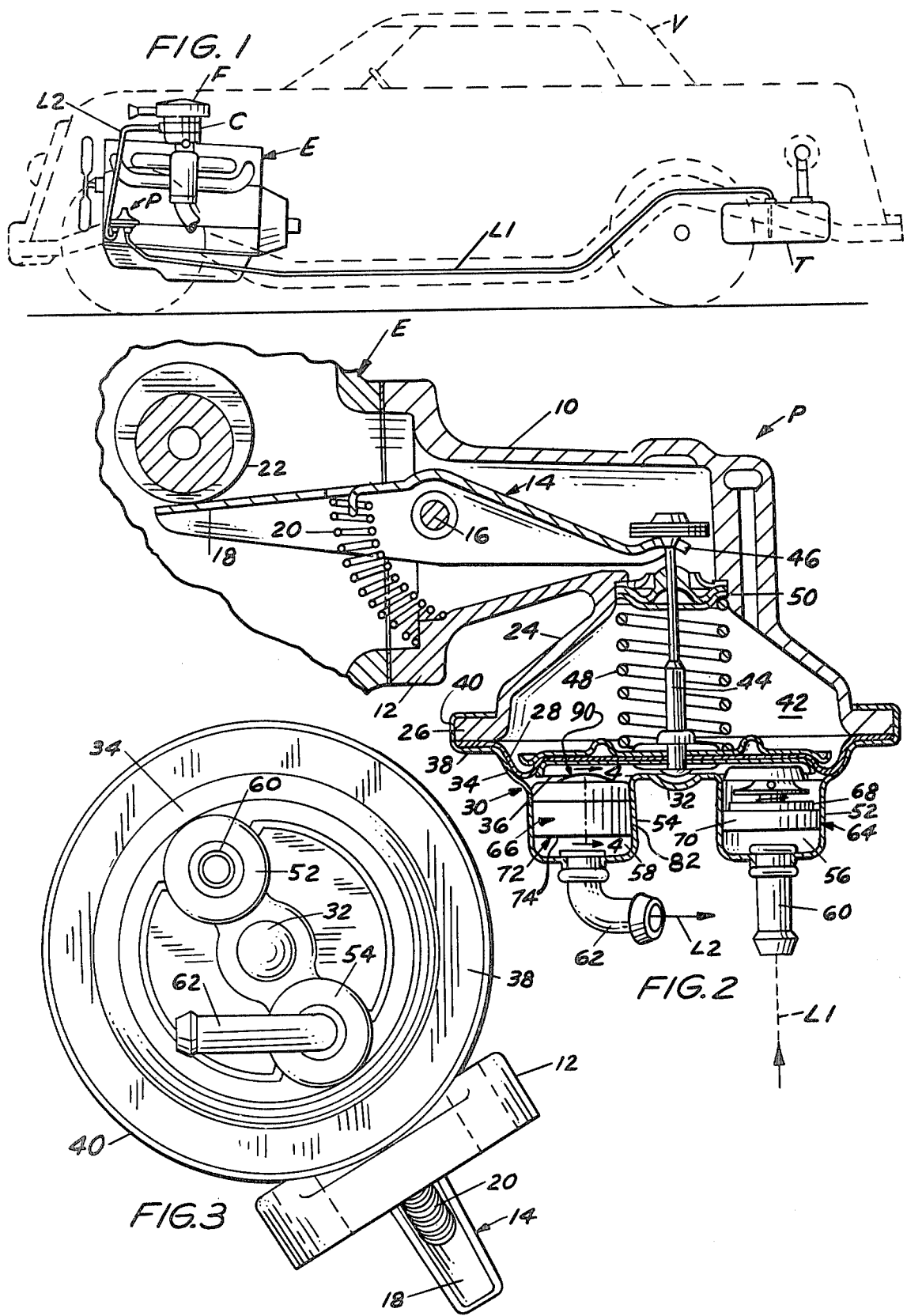

CONTROL VALVE

BACKGROUND OF THE INVENTION

This invention relates to automotive fuel pumps and, more particularly, to a control valve for use in a fuel pump to prevent fuel leakage.

One problem with automotive fuel pumps is leakage which may occur, for example, when the rear end of a front engine mounted automobile is elevated with respect to the front end. In such an instance, a positive head of fuel builds up between the automobile's fuel tank and the fuel pump to which it is connected and the resultant pressure may produce leakage through the pump. As a consequence, the fuel leaking to the carburetor or the engine causes flooding. Further, there is danger that if leakage through the fuel pump occurs as the result of an accident, i.e. if the vehicle overturns, a fire may result. Conventional check valves of the type normally found in automotive fuel pumps do not solve this problem because they are not designed to resist fuel flow in the normal direction of flow through the pump. Further, such valves are subject to sticking and corrosion.

SUMMARY OF THE INVENTION

Among the several objects of the present invention may be noted the provision of a control valve for use in an automotive fuel pump; the provision of such a control valve for withstanding a significant positive pressure head in the normal direction of flow through the pump when the pump is not operating with little or no leakage of fuel resulting; the provision of such a control valve which presents no barrier to the normal flow of fuel through the pump when it is operating to supply fuel to an engine; and the provision of such a control valve which does not stick and whose moving parts do not deteriorate under normal pump operating conditions.

Briefly, a control valve of the present invention is for use in an automotive fuel pump and comprises a housing for installation in the fuel pump, the housing having a central circular opening therethrough the peripheral surface of which is curved. A valve member is movable relative to the circular opening and has an outer curved contact surface for sealingly contacting the curved peripheral surface to prevent flow of a fuel through the opening, the curved surface of the valve member tangentially contacting the curved peripheral surface to seal against flow through the opening. A coil compression spring seats against one end of the housing and continuously urges the valve member into sealing contact with the curved peripheral surface, the force exerted by the spring on the valve member being such that it remains seated and a minimal amount of fuel leakage occurs through the control valve when the fuel pump is not pumping even though the curved contact surface of the valve member is subjected to a force applied in the normal direction of fuel flow through the control valve equal to a predetermined positive head of fuel. Other objects and features will be in part apparent and in part pointed out hereinafter.

BRIEF DESCRIPTION OF THE DRAWINGS

FIG. 1 is a schematic view of an automotive vehicle having a fuel pump incorporating the present invention;

FIG. 2 is a vertical section of the fuel pump of FIG. 1 having inlet check valve and an outlet control valve and being driven from the crankshaft of the automotive vehicle;

FIG. 3 is a bottom plan of the fuel pump shown in FIG. 2;

Corresponding reference characters indicate corresponding parts throughout the several views of the drawings.

DESCRIPTION OF A PREFERRED EMBODIMENT

Figure 5:
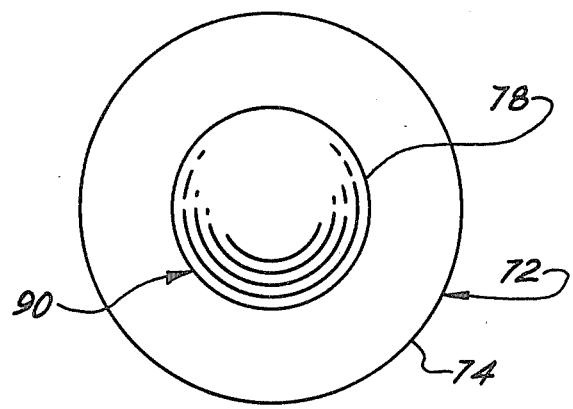
FIG. 5 is a top plan view of the control valve of FIG. 4.
Figure 6:
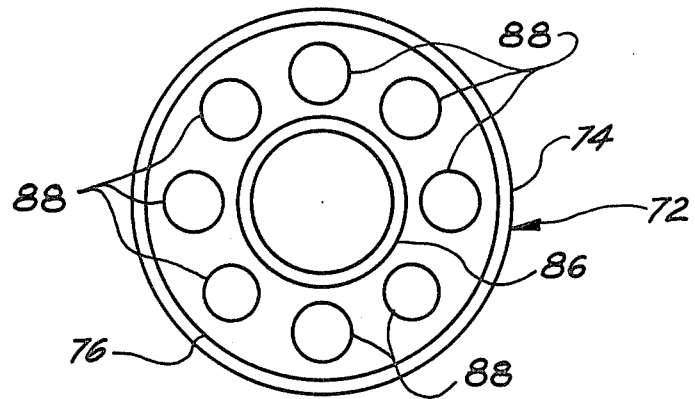
FIG. 6 is a bottom plan view of the control valve.

Referring to FIGS. 1 and 2 of the drawings, an engine E of an automotive vehicle V is illustrated on which is mounted a fuel pump P having a control valve of this invention incorporated therein. Fuel is delivered from fuel tank T to carburetor C for the engine. Carburetor C is mounted on the intake manifold of engine E and an air filter F is mounted on the air horn of carburetor C. Fuel line L1 extends from a fuel tank T to fuel pump P. Fuel line L2 extends from fuel pump P to carburetor C.

As shown in FIG. 2, Pump P is a so-called inverted pump, i.e., its outlet and inlet are located on the bottom of the pump. It is to be understood, however, that the present invention may be employed with a pump in which the inlet and outlet are located on top of the pump. Pump P comprises a rocker arm housing 10 which is open at one end and has a flange 12 for attaching to engine E. A rocker arm 14 is pivoted at 16 in housing 10 for rocking motion and has an inner end portion 18 biased by spring 20 into engagement with an engine-driven eccentric cam 22. Upon rotation of cam 22 through half a revolution from its FIG. 2 position, rocker arm 14 is rocked counter-clockwise against the bias of spring 20. Spring 20 returns arm 14 in a clockwise direction during the succeeding half revolution of cam 22.

Extending downward from rocker arm housing 10 is a hollow, generally conical, pump head 24. Conical head 24 has an outwardly projecting generally flat rim 26 at its bottom. The bottom of rim 26 provides a seating surface for the outer marginal portion of an annular diaphragm 28 which consists of a relatively thin disc of flexible fuel-resistant material, such as rubber or a synthetic resin material, which in its unstressed condition is substantially flat. The outer marginal portion of diaphragm 28 is clamped against the bottom of rim 26 by a pump body generally indicated at 30 which is of a one-piece thin sheet-metal construction having a bottom wall 32 and a flaring annular peripheral wall 34 defining a pumping or fuel chamber 36. Wall 34 includes an annular outwardly extending flat flange 38 and an annular rim 40 clamped over rim 26 of head 24 under a sufficient pressure to provide a fuel-tight seal about the marginal portion of diaphragm 28.

A valve chamber 42 is formed on the side of diaphragm 28 opposite fuel chamber 36. Diaphragm 28 has an actuating rod or stem 44 secured to a pair of metal plates on opposed sides of diaphragm 28. Stem 44 extends upwardly and is received within a slot 46 in the outer end of rocker arm 14. A coiled compression spring 48 is mounted within valve chamber 42 and is biased between diaphragm 28 and an oil seal and rod guide indicated generally 50. When rocker arm 14 is rotated in a counter-clockwise direction from FIG. 2, diaphragm 28 is pulled upwardly in a suction stroke. When rocker arm 14 moves in a clockwise direction spring 48 drives diaphragm 28 and stem 44 downwardly in a pumping stroke.

Bottom wall 32 of sheet metal pump body 30 has two cylindrical cup-shaped projections 52 and 54 which extend downwardly from bottom wall 32 on opposite sides of its center. Projection 52 defines an inlet passage or intake cavity 56 and projection 54 defines an outlet passage or discharge cavity 58. An inlet nipple 60 is provided at the end of projection 52 and an outlet elbow 62 is provided at the outlet end of projection 54. Nipple 60 provides for connection of supply line L1 to an intake valve generally indicated 64. Elbow 62 provides for connection of discharge line L2 from fuel pump P to carburetor C and receives fuel from a control valve of the present invention generally indicated 66.

Valve 64 is a check valve of conventional construction including an elastomeric disc-shaped valve member 68 urged by a compression spring into engagement with a valve seat 70 having a plurality of openings therein. Valve member 68 is unseated upon a suction stroke of diaphragm 28 to permit fuel to pass through the openings in valve seat 70 from line L1 to fuel chamber 36. For further details of check valve 64, reference is made to U.S. Pat. No. 3,150,601 dated September 29, 1964, the entire disclosure of which is incorporated by this reference.

Control valve 66 comprises a valve body or housing 72 pressed fit into projection 54. Housing 72 consists of an inverted cylindrical cup-shaped cap 74 which fits over a seat or base 76. The top of cap 74 has a central circular opening 78 therethrough and the peripheral surface of the opening is curved as indicated at 80. Cap 74 has a downwardly extending sleeve portion 82 in which is received an upwardly extending outer peripheral flange 84 of seat 76. The lower end of sleeve 82 is crimped or otherwise pressed over seat 76 to hold the seat in position. Seat 76 is pressed outwardly as indicated at 86 to form a seat for a spring as will be discussed. Further, the seat has a plurality of openings 88 arranged in a circular pattern about the base of the seat for flow of fuel from the control valve to outlet elbow 62.

Figure 4:
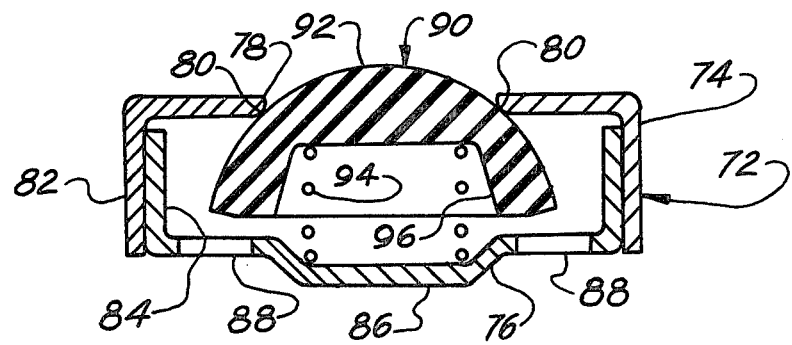
FIG. 4 is a sectional view of a control valve of the present invention taken generally along line 4—4 of FIG. 2.

A valve member 90 is movable relative to opening 78. The valve member is of rubber or a suitable synthetic resin material which may be a fuel-resistant synthetic rubber. The valve member is spherical in form and has an outer curved contact surface 92 for sealingly contacting curved peripheral surface 80 of circular opening 78 to prevent flow of a fuel through the opening. As shown in FIG. 4, curved surface 92 of valve member 90 tangentially contacts curved surface 80 of opening 78, that is, a line drawn through each point of contact between the valve member and the contact surface would be tangential to both curved surfaces. By forming the valve member and the contact surface of the opening so only tangential contact is made, the problem of sticking or "corking" is eliminated and this reduces the force necessary to seat the valve member against the opening and seal against fuel flow in the normal direction of flow through pump P.

Of further importance in effecting the seal between valve member 90 and the peripheral contact surface of opening 78 is the finish on the outer contact surface of the valve member. It has been experimentally found that this outer contact surface should have a Rubber Manufacturer's Association (RMA) class 2 finish. Also, the outer contact surface of the valve member should have a surface hardness of approximately 70 durometer as measured according to the American Society for Testing and Materials (ASTM) standards. If the outer contact surface is softer, abrasion occurs and the seal increasingly leaks. If the outer contact surface is harder, the valve member will not seal properly to begin with.

A coil compression spring 94 seats against one end of the housing, i.e., against pressed-out portion 86 of seat 76, and continuously urges valve member 90 into sealing contact with curved peripheral surface 80 of opening 78. Valve member 90 is formed with a recess 96 in its underside and spring 94 seats in this recess. The force exerted by spring 94 on valve member 90 is such that the valve member remains seated and a minimal amount of fuel leakage occurs through control valve 66 when fuel pump P is not operating (i.e., when engine E is Off) even though curved contact surface 92 of valve member 90 is subjected to a force applied in the normal direction of flow through the control valve, this force being equal to a predetermined positive head of fuel. Thus, for example, at a static or low fuel flow condition, it has been experimentally found that a spring 94 capable of exerting a seating force on valve member 90 of approximately 5.5 ounces (24.2 g) at the working height seals the valve against a positive head of 28–34 inches (71.5–86.4 cm) of fuel. This means no visible leakage of fuel or less than 1 cc/min. fuel flow through the control valve. Further, it is possible to so design spring 94 that valve member 90 seals against a positive head of fuel in the range of 24–48 inches 61–122 cm) of fuel. At the same time, the control valve is capable of permitting normal flow of fuel through the valve when the pump is operating. In such a circumstance, valve member 90 unseats and fuel flows around the valve member, out through openings 88 in seat 76 and, via outlet elbow 62, to line L2.

In view of the above, it will be seen that the several objects of the invention are achieved and other advantageous results attained.

As various changes could be made in the above construction without departing from the scope of the invention, it is intended that all matter contained herein or shown in the accompanying drawings shall be interpreted as illustrative and not in a limiting sense.

What is claimed is:

1. A control valve for use in an automotive fuel pump comprising:

a housing installed in the fuel pump, said housing including a cap whose top surface has a central circular opening therein forming a fuel inlet, the peripheral surface of which is outwardly curved and a seat over which the cap fits, the seat having at least one opening therein forming a fuel outlet;

a valve member positioned in the housing and movable relative to said circular opening, the valve member having an outer spherically curved contact surface for tangentially contacting said outwardly curved peripheral surface of the opening to form a seal at the curved peripheral surface of the opening and prevent flow of fuel therethrough, said valve member being of rubber and the contact surface thereof having a Rubber Manufacturing Association (RMA) class 2 finish and a surface hardness of approximately 70 durometer; and a coil compression spring seating against said seat and bearing against said valve member to continuously urge said valve member into sealing contact with said curved peripheral surface of said opening, the spring exerting a force on said valve member such that the valve member remains seated against a positive head of fuel in the range of 24 inches to 48 inches of fuel applied in the normal direction of fuel flow through the control valve, whereby a minimal amount of fuel leakage occurs through the control valve when said fuel pump is not pumping.

2. A control valve for use in an automotive fuel pump comprising:

a housing installed in the fuel pump, said housing including a cap whose top surface has a central circular opening therein forming a fuel inlet, the peripheral surface of which is outwardly curved and a seat over which the cap fits, the seat having at least one opening therein forming a fuel outlet;

a valve member positioned in the housing and movable relative to said circular opening, the valve member having an outer spherically curved contact surface for tangentially contacting said outwardly curved peripheral surface of the opening to form a seal at the curved peripheral surface of the opening and prevent flow of fuel therethrough, said valve member being of a synthetic resin material and the contact surface thereof having a Rubber Manufacturing Association (RMA) class 2 finish and a surface hardness of approximately 70 durometer; and a coil compression spring seating against said seat and bearing against said valve member to continuously urge said valve member into sealing contact with said curved peripheral surface of said opening, the spring exerting a force on said valve member such that the valve member remains seated against a positive head of fuel in the range of 24 inches to 48 inches of fuel applied in the normal direction of fuel flow through the control valve, whereby a minimal amount of fuel leakage occurs through the control valve when said fuel pump is not pumping.

* * * * *